Jan. 28, 1936. J. A. BURNER 2,029,153
REFRIGERATION PROCESS AND APPARATUS
Original Filed Aug. 30, 1929 3 Sheets-Sheet 1
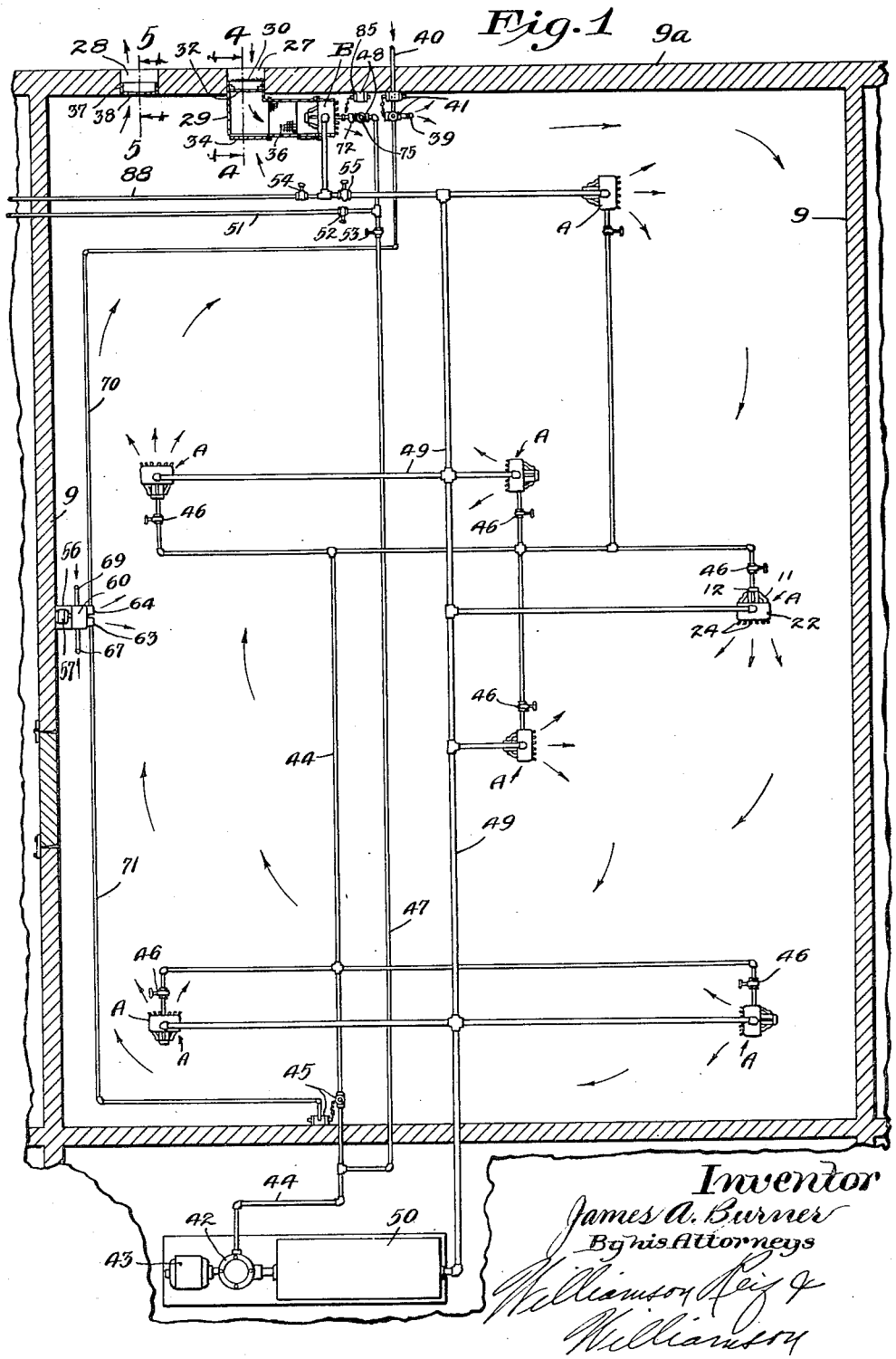

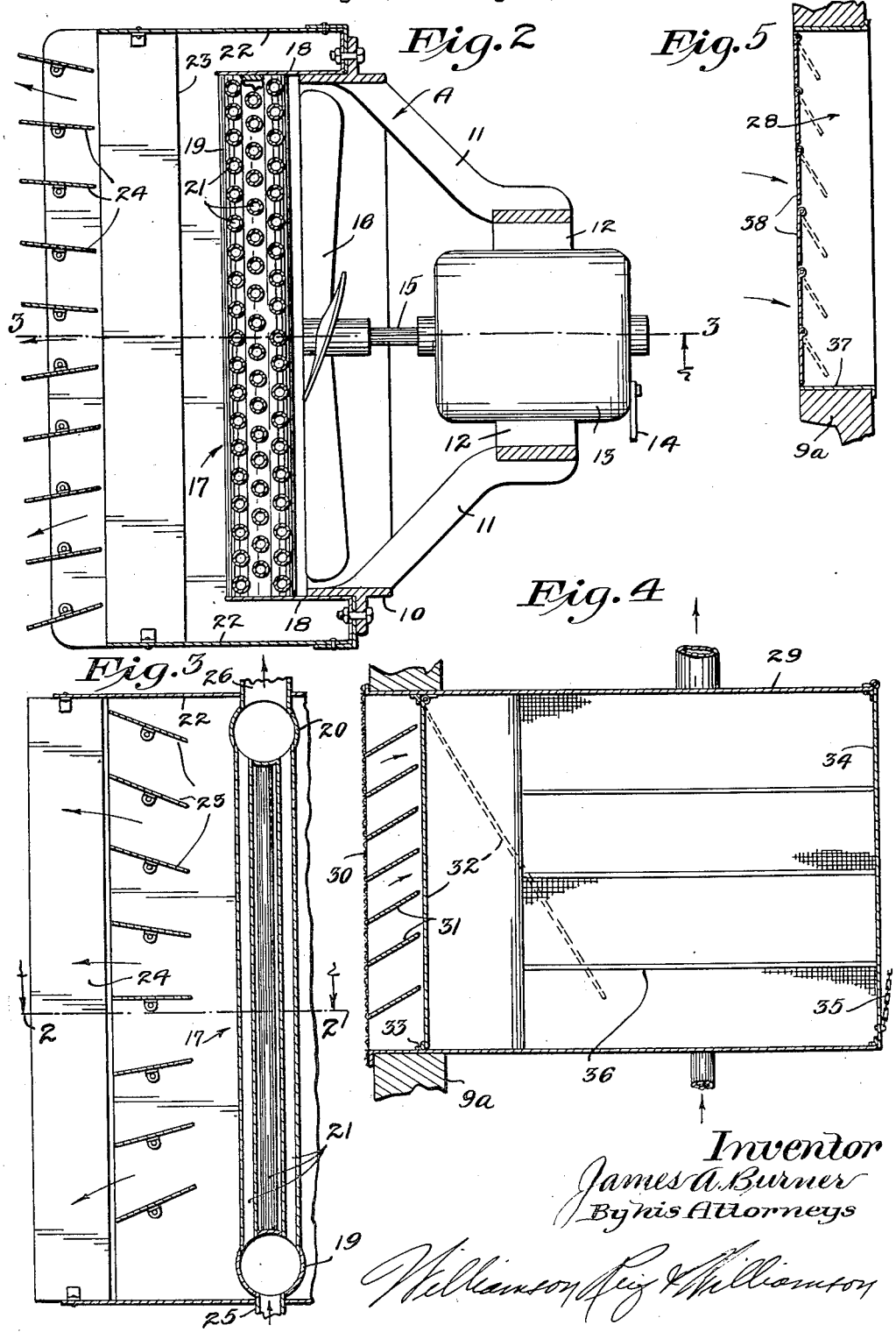

Jan. 28, 1936. J. A. BURNER 2,029,153
REFRIGERATION PROCESS AND APPARATUS
Original Filed Aug. 30, 1929 3 Sheets-Sheet 3
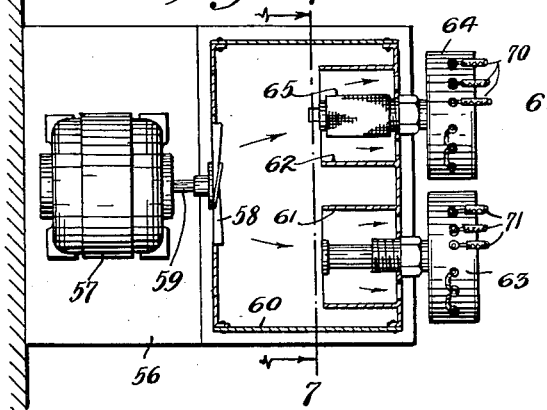
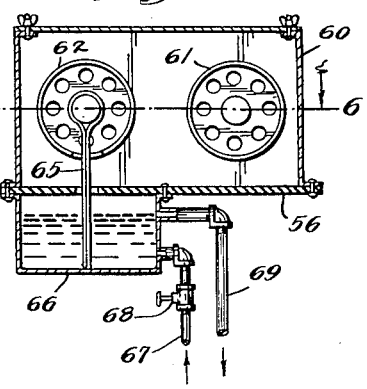
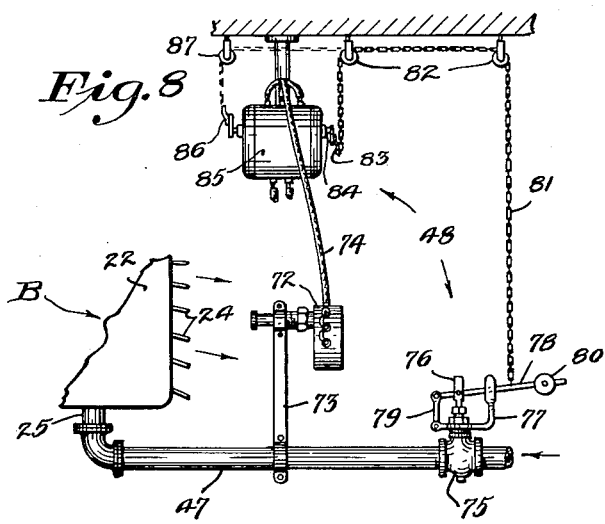
Inventor
James A. Burner
By his Attorneys Patented Jan. 28, 1936

2,029,153

UNITED STATES PATENT OFFICE 2,029,153

REFRIGERATION PROCESS AND APPARATUS

James A. Burner, Minneapolis, Minn., assignor to Air Systems Incorporated, Minneapolis, Minn., a corporation of Minnesota Application August 30, 1929, Serial No. 389,486
Renewed November 16, 1933

8 Claims. (Cl. 62—171)

This invention relates to refrigerating processes and apparatus.

At the present time what may be termed a combined ammonia and brine refrigeration process is used in most cold storage plants. In carrying out the so called combination ammonia and brine process, ammonia is forced through pipes in a brine tank to cause the ammonia to absorb the heat from the brine and volatilize, whereupon the brine is carried through a series of pipes in the cold storage chamber to cool the air therein. It is possible to cool the brine to only a certain low temperature before the brine will freeze and, accordingly, the heat absorptive area of the brine pipage in the cold storage chamber must be large in order that the air in the chamber may be maintained at low temperatures. Although some attempts have been made to pipe liquid ammonia directly into a cold storage chamber and there allow the ammonia to volatilize, it has been found that the amount of heat absorbed by the ammonia to cause the same to volatilize is so great that it is very difficult to uniformly control the temperature of the air in the cold storage chamber. It is a well known fact that the relative humidity of air in a cold storage chamber should be high (preferably from 50% to 85%) in order that eggs, fruits, vegetables and other foodstuffs may not lose a high percentage of their water content while being stored in the chamber. Although some attempts have been made to utilize air having a high moisture content in such chambers, difficulty has been encountered in using other than completely dry air for the reason that it has been found that moisture in the air will condense on the radiation coils of the refrigerating apparatus, and there form frost. Such layers of frost on the refrigeration coils act as an insulation to prevent the heat from the air of the room being readily absorbed by the refrigerant and it, therefore, becomes necessary to frequently scrape or steam off this frost or completely shut down the refrigeration plant for short periods of time to permit this frost to melt.

It is an object of this invention to provide novel and improved refrigerating processes, and novel and improved apparatus for carrying out these processes, whereby liquid ammonia or similar highly volatile refrigerants can be carried directly into a cold storage chamber and the refrigerant can there be volatilized to cool the air in such a chamber and the temperature of the air can be controlled as desired.

Another object of the present invention is to provide novel processes and apparatus for carrying out the processes which will permit the air in a cold storage chamber to contain practically any desired quantity of moisture, and will yet prevent the formation of frost on the refrigerating apparatus to an extent where defrostation is necessary.

A further object is to provide an apparatus for carrying out my refrigerating processes which will take up but a small amount of space within a cold storage chamber, to permit a larger quantity of goods to be stored in a cold storage chamber of given dimension than with present apparatus which usually include large and bulky brine coils or the like taking up a large portion of the otherwise available storage space in the chamber.

Still another object of the invention is to provide a process for circulating cold air to all portions of a cold storage room, or other enclosure, by utilizing an apparatus made in units so that any desired number of units may be placed in a particular cold storage chamber to suit the refrigeration requirements of the particular chamber.

It is yet another object to automatically control the temperature of air in the room or enclosure within which my refrigerating process is carried out and to also control the relative humidity in the room or enclosure.

Yet another object, regardless of the relative humidity of air in the cold storage chamber is to prevent the condensation of moisture on walls, floors, and ceilings of the chamber and on goods stored in the chamber by maintaining a continuous circulation of air in the chamber.

A further object is to maintain continuous circulation of fresh air from the atmosphere in and out of the cold storage chamber to carry off odors from goods stored in the chamber, and to also prevent the spread of deterioration and decay in the goods.

In connection with the supplying of fresh air from the atmosphere to the cold storage room, it is another object to control the temperature of the atmospheric air as it is admitted to the cold storage chamber, to cool atmospheric air warmer than the desired temperature of air in the chamber and to heat atmospheric air colder than the desired temperature of air in the chamber. In cold climates, it will thus be possible to cool the air in the cold storage chamber at times by using atmospheric air, and yet the desired temperature of the air in the cold storage chamber need not be varied.

These and other objects and advantages of the present invention will more fully appear from the following description made in connection with the accompanying drawings, wherein like reference characters refer to the same or similar parts throughout the various views, and, in which, Fig. 1 is a horizontal section through a cold storage room and illustrating an installation of an apparatus that may be used for carrying out my processes;

Fig. 2 is a horizontal section through one of the unit refrigerating devices illustrated in Fig. 1 of the drawings, the section being taken on the line 2—2 of Fig. 3, as is indicated by the arrows;

Fig. 3 is a vertical section taken on the line 3—3 of Fig. 2, as indicated by the arrows;

Fig. 4 is a vertical section taken on the line 4—4 of Fig. 1, as indicated by the arrows;

Fig. 5 is a vertical section taken on the line 5—5 of Fig. 1, as indicated by the arrows;

Fig. 6 is a horizontal section through a type of combined thermostat and humidostat that may be used, the section being taken on the line 6—6 of Fig. 7, as indicated by the arrows;

Fig. 7 is a vertical section taken on the line 7—7 of Fig. 6, as indicated by the arrows; and Fig. 8 is a view in side elevation illustrating portions of a type of master unit refrigerating device that I may use if desired, together with a thermostat and a motor operated control valve, such as may be used therewith.

Although it is possible to carry out my refrigerating process and processes by utilizing apparatus of various types, I have illustrated one practical type of apparatus which I have successfully used in actual practice, and my process and processes will be described in connection therewith.

Referring to the drawings, the walls of a cold storage room are designated by the numeral 9, one wall 9a of which is preferably in communication with the atmosphere. Situated at various points within the cold storage room, are a plurality of what I may term refrigeration units A and one master unit B. The units A and B may be practically identical in structure and I will, therefore, describe the structure of only one of these units which is illustrated in detail in Figs. 2 and 3.

Each unit A and B as shown, includes a suitable rectangular frame 10 which may be supported as desired, on the floor of the cold storage room. Secured to the frame 10 and projecting rearwardly therefrom are a pair of arms 11 carrying therebetween a motor base 12 upon which an electic motor 13 is mounted. The motor 13 used is preferably of the variable speed type, the speed thereof being adapted to be controlled by means of a lever 14 shown in Fig. 2. The motor shaft 15 carries at its forward end a large fan 16 which preferably is of a diameter approximating the width of the frame 10. A refrigerating coil very similar in construction to an automobile radiator and designated as a whole by the numeral 17 is secured in vertical relation directly ahead of the fan 16 as by means of angular side plates 18 bolted or otherwise secured to side flanges on the frame 10, and the radiating coil 17 consists of two horizontal headers 19 and 20 disposed in vertically spaced relation, and a plurality of rows of vertical tubes 21 running between the headers 19 and 20, communicating therewith, and preferably welded therein. Any desired number of refrigerating coils 17 may be placed ahead of each fan 16. A rectangular casing 22 is secured to the side flanges of the frame 10 to fit about the radiating coil 17 and project forwardly therefrom, and mounted in the casing 22 to project directly ahead of the radiating coil 17 to turn about horizontal pivots, are a series of vertically spaced air deflecting louver bars 23, the said bars being adapted to be adjustably turned about their pivots to extend at various angles as best shown in Fig. 3, and to be held in frictional engagement with the sides of the casing 22 in their adjusted position. The sides of the casing 22 terminate approximately evenly with the forward edges of the louver bars 23, but the tops and bottoms of the casing are projected forwardly from the forward edges of the sides of the casing, and a plurality of laterally spaced air deflecting louver bars 24 extend between the forwardly projecting portions of the top and bottom of the casing, and are mounted therein on vertical pivots. The louver bars 24 may be angularly adjusted about their vertical pivots as shown in Fig. 2, and may be held in frictional engagement with the top and bottom of the casing 22 after being so adjusted. The lower header 19 of the refrigerating coil 17 will preferably be provided with a small inlet port 25 while the upper header 20 will preferably be provided with a large outlet port 26.

Referring back now to Fig. 1 of the drawings, and to Figs. 4 and 5, it will be noted that the wall 9a of the cold storage room is provided with two openings, an air inlet opening 27 and an air outlet opening 28. An L-shaped casing 29 is mounted in the opening 27 and this casing is open at its two ends and is open directly rearwardly from its outer end and the opening 27, for the admission of air from outside the cold storage room into the casing. A screen 30 is preferably placed in opening 27 over the open outer end of the casing 29, and fixed louver bars 31 are mounted in the sides of the casing adjacent the outer open end to preclude the entrance of rain into the casing. Inwardly from the louver bars 31, a swinging door 32 is pivoted to the top of the casing and a stop 33 is adapted to limit the outward swinging movement of the door. Opening movement of the door 32 is adapted to be controlled automatically by air pressure, or it may be otherwise controlled if desired. Another door 34 operated as by a chain 35 is pivoted to the top of the casing 29 to normally close the opening in the casing immediately rearward from the opening 27. The master refrigeration unit B is secured to or otherwise disposed in front of the inner or right end of the casing 29, as viewed in Fig. 1, and intermediately disposed between the master unit B and the door 34, is an air filter 36 which may be of any desired type but preferably will be of the type known to the trade as "Airmat filter". A casing 37 is mounted in the opening 28 in wall 9a and pivotally mounted in the casing 37 for free swinging movement about horizontal pivots are a plurality of plates 38 adapted to normally stand in vertical relation to close the opening 28, but adapted to open to a limited extent when the air pressure in the cold storage room is greater than atmospheric pressure, to permit the exhaust of air from the room. Situated directly ahead of master unit B in the room is a steam nozzle 39 to which a steam supply pipe 40 runs, there being a humidostatically controlled motor operated valve 41 situated in the steam supply pipe 40 which will control the supply of steam to the nozzle 39. The construction of the valve 39 will be hereafter described.

A suitable compressor 42 operated as by means of a motor 43 is used for supplying liquid ammonia or other liquid highly volatile refrigerants under pressure to the various refrigerating coils 17. A main refrigerant supply pipe line 44 leads from the compressor 42 to each of the refrigerating coils 17 of the units A, and is connected to the small inlet ports 25 at the bottoms of the refrigerating coils 17. A main thermostatically controlled motor operated valve 45 is interposed in the pipe line 44 adjacent the pump 42 and the construction and operation of this valve will be hereinafter described. Hand operating valves 46 which may be merely globe valves of standard construction, are situated in the pipe line 44 adjacent each refrigerating coil 17 of the units A. A branch refrigerant supply pipe line 47 is connected to the pipe line 44 between the valve 45 and the pump 42 and runs to the lower inlet port 25 of the refrigerating coil 17 of master unit B. There is a thermostatically controlled valve 48 in the branch line 47 adjacent the master unit B, and the construction and operation of the valve 48 will be hereinafter described. A return pipe line 49 for carrying off the refrigerant in volatile state after it has passed through the refrigerating coils 17 is provided and various leads of this return pipe line are connected to the refrigerating coils 17 in both the refrigerating units A and the master refrigerating unit B. The return pipe line 49 runs to a condenser 50 situated adjacent the compressor 42 and the compressor 42 is connected to the condenser 50. In practice, some suitable means (not illustrated) will be provided for supplying refrigerating fluid to the condenser 50. A steam supply pipe 51 running from a source of steam supply is connected to the branch refrigerant supply line 47 adjacent the master unit B and the steam pipe 51 is provided with a valve 52 adapted to be used to control the supply of steam to the branch line 47, while the branch line 47 adjacent the point of jointure of the steam pipe 51 therewith is provided with a valve 53 adapted to control the supply of refrigerant from the branch line 47 to the refrigerating coil 17 of the master unit B. A steam exhaust pipe 88 is connected to the return pipe line 49 adjacent the master unit B and is equipped with a valve 54. Return line 49 is equipped with a valve 55 adjacent the point where the steam exhaust pipe 88 joins the same but spaced toward the condenser 50 therefrom.

In Figs. 6 and 7 a suitable type of combined thermostat and humidostat is illustrated for controlling the operation of motors adapted to act on the valves 45 and 39. In the drawings, a shelf is designated by the numeral 56 and mounted on the shelf is a motor 57 having a fan 58 secured to the motor shaft 59 thereof. The fan 58 fits within a rear opening of a rectangular casing 60 having two rearwardly projecting cylindrical shells 61 and 62 secured to the forward side thereof, there being a series of openings provided in the front side of the casing 60, to permit a draft of air created by the fan 58 to pass through the casing 60, and through the shells 61 and 62 and the forward wall of the casing. Centrally situated in the shells 61 and 62 and supported in the forward walls of the casing 60 are electric thermostatic controls 63 and 64 respectively, illustrated as being of the sylphon valve type. A wick 65 fits around the sylphon valve of the control 64 and runs downwardly through shell 62 and casing 60 into a water pan 66 to which water is supplied by means of a pipe 67 having a valve 68 therein, and from which water may drain continuously through a drain pipe 69. The control 64 is connected by suitable electrical connections 70 to the motor operated steam supply valve 41, while the control 63 is connected by suitable electrical connections 71 to the motor operated valve 45 situated in the main refrigerant supply line 44. A thermostatic control 72 illustrated as being of the sylphon valve type, similar to the controls 63 and 64, is mounted directly ahead of the master refrigerating unit B as by means of a suitable bracket 73, and the thermostatic control 72 is connected by suitable electrical conductors 74 to the motor operated valve 48 which controls the supply of refrigerant or steam to the coil 17 of the master refrigerating unit B. Although the valves 45, 39, and 48 may be of various types, they may all be similar to the type shown in Fig. 8 and designated by the numeral 48. The valve proper is shown as being a globe valve 75 of the plunger type, the plunger being designated by the numeral 76. A fork 77 is secured to the upper portion of the globe valve 75 and this fork acts as a guide for a lever 78 pivoted to the plunger 76 and to a pair of arms 79 pivoted at their lower ends to the lower portion of fork 77. The lever 78 carries at its free end an adjustable weight 80. A chain 81 is secured to the lever 78 adjacent its free end and runs upwardly over a pair of sheaves 82, and is attached at its upper end to an arm 83 carried on the shaft 84 of a motor 85, the starting and stopping of which is controlled by the thermostatic control 72. Each of the valves 45 and 39 may be exactly similar to the valve 48 with the exception that the control 63 will operate the motor of the valve 45, while the control 64 will operate the motor of the valve 39. The motor shaft 84 of the motor 85 for the valve 48 carries an arm 86 similar to the arm 83 at the opposite end thereof from the arm 83 and, at times, the chain 81 may be detached from the arm 83 and run over a sheave 87 and secured to the arm 86. The particular construction of the controls 63, 64, and 72 are not described in detail, and motor 85 is not described in detail inasmuch as there are standard types of motors now on the market controlled by thermostatic means and any of these motors may be used for operating the various valves or other constructions may be used, if desired, for controlling the various valves 45, 39, and 48 by thermostatic means.

*Operation*

Let us assume that it is desired to maintain the temperature of the air in a certain cold storage room at a fixed low temperature, that it is desired to maintain the relative humidity of the air in the cold storage room at a certain constant and that it is desired to continually admit a certain quantity of fresh air into the room and to exhaust a certain quantity of air from the room. The installation of the apparatus above described will be first made. The number of refrigerating units A used, will depend on the size of the room, the possible location of the units in the room, the temperature at which it is desired to maintain the room and the hottest weather conditions that are likely to ensue where the room is situated.

Let us assume that the apparatus is to be first used when the weather conditions are such that under normal circumstances atmospheric air is at a higher temperature than the desired temperature of the cold storage room. The thermostatic control 63 will be first set in such manner that when the temperature in the refrigeration room is higher than the desired temperature to be maintained, the valve 45 will be held open, while when the temperature in the room falls below the desired constant temperature, valve 45 will be closed automatically. The control 72 will be similarly set, while the control 64 will be set in such manner that steam may be admitted through the valve 41 to the steam nozzle 39 when the relative humidity in the room is below the desired level, while when the relative humidity in the room rises above the desired level, the valve 41 will be automatically closed off. It will be understood that water will constantly be supplied from the pipe 67 to the pan 66 in order that the wick 65 will be continuously moistened. The water return pipe 69 will act as an overflow from the pan 66 to maintain a constant level of water in the pan. Valves 52 and 54 will be closed while valves 53 and 55 will be opened so that refrigerant may flow freely into the refrigerating coil 17 of the master unit B from the branch supply pipe 47 and may flow freely from the refrigerating coil 17 of master unit B through the return refrigerant pipe line 49. A refrigerant, such as liquid ammonia, sulphur dioxide, or similar liquid highly volatile refrigerant will be supplied to the condenser 50. Steam may then be supplied through the steam nozzle 39 until the desired humidity in the air of the refrigeration chamber is reached. The apparatus may then be completely set in operation to cause the pump 42 to force liquid refrigerant under pressure to the refrigerating coils 17 of units A and B, and to cause the various motors 13 to be operated to rotate the fans 16 to force a strong draft of air through the refrigerating coils 17. The velocity of circulation of air through the refrigerating coils as caused by the fans 16 will be high, preferably from 1000 to 3000 feet per minute. It will be noted that the fans 16 work over practically the entire rear face area of the refrigerating coils 17. The hand valves 46 adjacent the various units A and the valve 53 adjacent the unit B can then be properly adjusted to supply the requisite amount of ammonia or other refrigerant to lower portions of the refrigerating coils from the refrigerant supply line 44. In adjusting the valves 46, and 53 each valve will be opened up fully until it is found that frost begins to form on the refrigerating coils 17 and closely adjacent parts. The valves 46 and 53 may then be closed off slightly until frost no longer forms on the refrigerating coils 17. The louver bars 23 and 24 of each refrigerating unit A and the louver bars 23 and 24 of the master unit B will be adjusted in such manner that air passing through the various refrigerating coils 17 of the units A and B may be deflected from one unit to another so that there will be a circulation of air in the refrigeration chamber at all points and this circulation will be in a continuous direction to follow a whirling action.

Outside air from the atmosphere will be admitted through the opening 27 into casing 29, inasmuch as the fan 16 of the master unit B will act to draw the door 32 inwardly substantially to the dotted position shown in Fig. 4. The relative amount of fresh air admitted to the room may be automatically regulated by varying the position of the door 34. If the door 34 is open, a large portion of the air admitted to the casing 29 will be brought into the casing after it has been circulated through the refrigeration chamber, and but a small amount of outside air will be admitted to the casing 29 through the opening 27. If the door 34 is closed or almost closed, a large amount of fresh air will be supplied to the casing 29 through the opening 27, and no air or but a small quantity of air will be supplied to the casing 29 from the refrigeration chamber. The air after being admitted to the casing 29 will be carried through the air filter 36 to cause the air to be cleaned, whereupon the air will be forced by the fan 16 of the master unit through the tubes 21 of the refrigerating coil 17 of the master unit B. Liquid refrigerant will be supplied under pressure to the lower portion of the refrigerating coil 17 of the master unit and as the fan 16 rapidly forces the air through the refrigerating coil, the ammonia or other highly volatile refrigerant will absorb large quantities of heat from the air passing between the tubes of the refrigerating coil, and this heat will cause the ammonia or other refrigerant to volatilize, and be carried off from the refrigerating coil through the refrigerant return line 49.

The air after passing through the refrigerating coil 17 of master unit B, will then pass outwardly from the casing 22 about the refrigerating coil of the master unit and will be deflected by the louver bars 23 and 24 into the refrigeration chamber. This air will come in contact with the thermostatic control 72 which controls valve 48 and the supply of refrigerant to the refrigerating coil of the master unit B. It will be understood that as long as the temperature of the air emitted from the master unit B is higher than the temperature for which thermostatic control 72 is set, valve 75 will be maintained in open position, to cause the refrigerant to be continuously supplied to the refrigerating coil 17 of the master unit. When the temperature of the air discharged from the master unit B falls below the temperature for which the thermostatic control 72 is set, the motor 42 will be set in operation to swing the arm 83 and slacken the chain, thereby permitting the weight 80 to carry the lever 78 downwardly and depress plunger 76 to close the valve 75, and prevent the refrigerant from flowing into the refrigerating coil 17 of the master unit. The motor 85 will again be actuated when the temperature of air discharged from the master unit B rises above that for which the control 72 is set to swing the arm 83, tighten the chain 81, raise the lever 78 and plunger 76 to open the valve 75.

After the air has been discharged from the casing 29 into the refrigeration chamber, it will come into contact with the steam discharged from the steam nozzle 39. Whether steam is or is not discharged from the nozzle 39 depends on the relative humidity of the air in the room. If the relative humidity is less than the humidity desired, the valve 41 will remain open to cause steam to be continuously supplied to the room. If, however, the relative humidity in the room reaches a point above the desired amount (i. e. the amount for which the humidostatic control 64 is set), the control will act to cause the valve 41 to be automatically shut off. It will be understood that the valve 41 will be operated by the humidostatic control 64 to regulate the supply of steam to the nozzle 39 in a manner similar to the manner in which the valve 48 is operated by the thermostatic control 72.

The air after passing about the spray nozzle 39 will be carried to a point behind one of the refrigerating units A, inasmuch as the louver bars 23 and 24 of the master unit B will be set to deflect the air in this direction. The air will then be forced by the fan 16 of the particular unit A to which the air is carried through the refrigerating coil of the particular unit A at a high speed to cause the refrigerant, supplied through the supply line 44, to the refrigerating coil 17 of the particular unit A, to absorb a large portion of the heat from the air and volatilize the refrigerant, whereupon the refrigerant passing through the refrigerating coil of the unit A will be carried off by the return line 49. The louver bars 23 and 24 of the first unit A will be so set that air will be deflected therefrom to other units, whereupon the air will pass through these units in similar manner and be carried from one unit to another to be cooled in its passage, and to circulate the air to all parts of the refrigeration room. When the air in the room reaches the requisite low temperature for which the thermostatic control 63 is set, this control will act to cause the valve 45 to be shut off, thereby shutting off the supply of refrigerant from the supply line 44 to the various refrigerating coils 17 of units A. When the temperature of the air in the room is again raised to a point slightly above the desired temperature which it is intended to maintain the air in the room, the valve 45 will again open up to again supply refrigerant to the various refrigerating coils. It will be understood that the thermostatic control 63 acts to control the valve 45 in a manner similar to the manner in which the thermostatic control 72 acts to control the valve 48.

When the air pressure in the room, due to the constant supply of fresh air thereto, reaches a pressure above the atmospheric pressure of outside air, a certain quantity of air from the room will be forced between the swinging plates 38 outwardly through the outlet opening in the wall 9a. A constant circulation of fresh air into the room and of air out of the room after it has been circulated about the room, will thus be automatically maintained, and by opening or closing the door 34 varying amounts, the quantity of air admitted and exhausted may be varied. By this admission and exhaust of air to and from the room, odors from the goods stored in the room may be carried off and the goods will be maintained in fresh condition. The goods will not deteriorate and decay as they would if fresh air was not continuously supplied to the refrigeration room.

Due to the fact that the air is forced rapidly through the refrigerating coils of the various units A and B, water will not condense on the refrigerating coils or adjacent parts to form frost to any appreciable extent and it is thus never necessary to scrape or steam off frost from the refrigerating coils or to shut down the plant in order that the refrigerating coils may be defrosted. The constant circulation of air in the room will prevent the condensation of moisture on the walls, floor and ceiling of the room and on goods stored in the room irrespective of the humidity of the air in the room and thus all parts of the room may be maintained in dry condition. The desired amount of moisture may be supplied to the room to maintain the air at a desired relative humidity and, accordingly, goods stored in the room will not loose a large percentage of their water content, as is the case where the relative humidity in a cold storage room is low.

The thermostatic controls will act to maintain the room at a constant even temperature at all times. If outside weather conditions are such that the temperature of atmospheric air is lower than the temperature at which it is desired to maintain the air in the refrigeration room, the valves 53 and 55 may be shut off and the valves 52 and 54 may be opened, whereupon steam from a suitable source may be supplied through the steam supply pipe 51 to the radiator-like coil 17 of the master unit to heat the air as it is admitted to the room from outside. The chain 81 connected to the lever 78 of valve 48 will be detached from the arm 83 and carried over the sheave 87 and secured to the arm 86, whereupon the thermostatic control 72 will act in an opposite manner than when a refrigerant is being supplied to the coil 17 of the master unit A. When steam is being supplied to the coil 17 of master unit B and the air supplied to the room reaches a higher temperature than the temperature for which the control 72 is set, the valve 48 will be automatically turned off to cut off the supply of steam to the coil 17 of the master unit. When the temperature of the air in the room reaches a lower point than the temperature for which the control 72 is set, the valve 48 will be opened to permit steam to be supplied to the coil 17 of the master unit.

It will be understood that when the apparatus is in operation, the return pipe 49 will carry off the refrigerant in volatile condition from the various refrigerating coils 17 and will also carry off the refrigerant in volatile state from the coil of the master unit B when a refrigerant is being supplied to the same. The return pipe 49 discharges into the condenser 50 where the volatile refrigerant will be condensed into liquid state and a vacuum will thus be created in the return pipe 49 to create a suction at the tops of the various refrigerating coils 17.

Due to the rapidity of circulation of air through the various refrigerating coils 17, these refrigerating coils may be made quite small so that each unit A and B will take up small space, although each unit will be capable of absorbing a large amount of heat. The space required by the apparatus in the refrigeration chamber is thus small in comparison to the large refrigeration coils that are now used in most cold storage plants. The available storage space for goods to be refrigerated in a chamber of certain size when the present apparatus is used, accordingly, is much greater than the available space for storage of goods in rooms using other type of apparatus, and yet as good or better refrigeration of the goods in the rooms is obtained. Due to the fact that the apparatus is made in units, any number of units may be installed in a refrigeration room without changing the construction of the various units and the air in the room may be cooled to any desired temperature. Also for installations of different types, various constructions of the units need not be made.

Due to the fact that the louvers 23 and 24 are made adjustable, a continuous circulation of air in rooms of any shape can be obtained by use of the present unit construction.

In the apparatus shown, although I prefer to control the temperature of the air in the refrigeration chamber by controlling the source of supply of refrigerant to the various refrigerating coils, it is possible to control the temperature of the air by varying the speed of the fans 16. For this purpose, I have shown the motors 13 as being variable speed motors, the speed thereof being adjustable by means of the levers 14. If the speed of a fan 16 is reduced, the absorbtion of heat by the refrigerant passing through a refrigerating coil 17 will not be nearly as great as would otherwise be the case, if the fan 16 were revolving at higher speed. I can, of course, use means for controlling the speed of the fan in combination with means for controlling the supply of refrigerant to the radiators, as illustrated. My refrigerating processes can be carried out not only to cool cold storage chambers of various types, such as cold storage plants, railroad refrigerator cars, domestic refrigerators and the like, but it can also be used for cooling theaters, public buildings, homes and the like. For certain classes of work, it will be unnecessary to use the master refrigerating unit B, and it will be understood that one or any number of the refrigeration units A may be used.

It will be understood that my process of forcing air rapidly through a refrigerating coil to which a refrigerant is supplied to cause heat from the air to be absorbed by the refrigerant, can be carried out by utilizing apparatus of other types than the apparatus illustrated and described. Also the continuous circulation of air in a cold storage room can be accomplished by using other apparatus than that shown. It is also possible to control the humidity and temperature of the air in the refrigeration chamber in different ways than shown.

It will be understood that various changes may be made in my processes and in the various steps of my processes, without departing from the scope of the present invention, and that various changes may be made in the form, details, arrangement and proportions of the various parts in my apparatus without departing from the scope of my invention.

What is claimed is:

1. A refrigerating process for cooling refrigeration chambers which consists in supplying a refrigerant to a plurality of refrigerating coils located at different points in the chamber to be cooled, passing air rapidly through the various refrigerating coils to cause the refrigerant to absorb heat from the air and deflecting the air as it passes through the refrigerating coils in such manner as to maintain a constant circulation of air in a desired direction to all portions of the refrigeration chamber.

2. A refrigerating apparatus comprising a refrigerating coil, means for supplying a refrigerant to the interior of said refrigerating coil, means forcing air through the refrigerating coil, means permitting the exhaust of the refrigerant from the refrigerating coil, a series of louver plates disposed in front of said refrigerating coil and mounted for adjustment about horizontal axes and a series of louver plates disposed in front of said refrigerating coil and mounted for adjustment about vertical axes.

3. A refrigeration plant comprising a refrigeration chamber, a plurality of refrigeration units mounted in said chamber, means for supplying a refrigerant to said units, means for carrying off the refrigerant from said units, means for forcing a continuous circulation of air from unit to unit in said chamber, means for supplying fresh air from the outside atmosphere to said chamber, and means for exhausting air from said chamber after it has circulated therethrough.

4. A refrigeration plant having in combination, a refrigeration chamber, a master refrigerating coil situated in said chamber, a plurality of auxiliary refrigerating coils also situated in said chamber, fans forcing air through both said master refrigerating coil and said auxiliary refrigerating coils, means for supplying a refrigerant to all of said refrigerating coils, means for carrying off the refrigerant from all of said refrigerating coils, means for admitting fresh atmospheric air to the fan forcing air through said master refrigerating coil, means deflecting the air after its passage through said master refrigerating coil to auxiliary refrigerating coils and from one auxiliary refrigerating coil to another to maintain a constant circulation of air and means permitting the exhaust of air from the chamber after it has passed through said refrigerating coils.

5. The structure defined in claim 4 and means for supplying air to said master refrigerating coil from said chamber to regulate the quantity of fresh air admitted to said master refrigerating coil by said admission means and to also regulate the quantity of air exhausted from said chamber.

6. A refrigeration plant having in combination a refrigeration chamber, a master refrigeration unit situated in said chamber, a plurality of auxiliary units also situated in said chamber, means for supplying a refrigerant to each of said master and auxiliary units, means for carrying off the refrigerant from each of said master and auxiliary units, means for forcing air rapidly through said master unit and said auxiliary units, means for deflecting said air from said master unit to said auxiliary units and from one auxiliary unit to another to maintain a constant circulation of air in said chamber, means for supplying a portion of the air carried to said master unit from the outside atmosphere, means for regulating the supply of refrigerant to said master unit from the temperature of the air after it has passed through said unit, and means for regulating the supply of refrigerant to said auxiliary units from the temperature of the air in said chamber.

7. A refrigerating process for cooling refrigeration chambers which consists in supplying a refrigerant to a plurality of refrigerating coils located at different points in the chamber to be cooled, passing air rapidly through the various refrigerating coils to cause the refrigerant to absorb heat from the air, supplying moisture to the air in the refrigeration chamber and deflecting the air as it passes through the refrigerating coils in such manner as to maintain a constant circulation of air in a desired direction to all portions of the refrigeration chamber and to prevent the condensation of moisture on the walls, floor and contents of the refrigeration chamber.

8. The process defined in claim 1, admitting fresh atmospheric air to the refrigeration chamber and exhausting quantities of the circulated air from the refrigeration chamber.

JAMES A. BURNER.